United States Patent
Kim

(10) Patent No.: US 9,688,304 B2
(45) Date of Patent: Jun. 27, 2017

(54) METHOD OF CONTROLLING ACTIVE REAR WHEEL STEERING APPARATUS

(71) Applicant: MANDO CORPORATION, Pyeongtaek-si (KR)

(72) Inventor: Sang Mook Kim, Suwon-si (KR)

(73) Assignee: MANDO CORPORATION, Pyeongtaek-Si (KR)

(\*) Notice: Subject to any disclaimer, the term of this patent is extended or adjusted under 35 U.S.C. 154(b) by 118 days.

(21) Appl. No.: 14/306,789

(22) Filed: Jun. 17, 2014

(65) Prior Publication Data

US 2015/0057887 A1 Feb. 26, 2015

(30) Foreign Application Priority Data

Aug. 20, 2013 (KR) ........................ 10-2013-0098700

(51) Int. Cl.
*B62D 7/15* (2006.01)
*B62D 6/00* (2006.01)
*B62D 15/02* (2006.01)

(52) U.S. Cl.
CPC ............. *B62D 6/007* (2013.01); *B62D 7/159* (2013.01); *B62D 15/027* (2013.01); *B62D 15/0285* (2013.01)

(58) Field of Classification Search
CPC ........................... B62D 7/1509; B62D 15/0285
See application file for complete search history.

(56) References Cited

U.S. PATENT DOCUMENTS

| 6,615,944 B1 | 9/2003 | Horwath et al. | |
| 8,068,955 B2 * | 11/2011 | Yanagi | B62D 7/148 |
| | | | 280/86.758 |
| 2005/0236894 A1 * | 10/2005 | Lu | B60T 8/1755 |
| | | | 303/139 |
| 2006/0235590 A1 * | 10/2006 | Bolourchi | B62D 7/159 |
| | | | 701/41 |
| 2007/0176488 A1 * | 8/2007 | Miyajima | B60W 10/18 |
| | | | 303/146 |

(Continued)

FOREIGN PATENT DOCUMENTS

| DE | 38 16 254 | 11/1989 |
| DE | 198 52 155 | 3/2000 |

(Continued)

OTHER PUBLICATIONS

Office Action dated Sep. 28, 2015 for German Patent Application No. 10 2014 009 130.9.

(Continued)

*Primary Examiner* — Redhwan k Mawari
*Assistant Examiner* — Michael Whalen
(74) *Attorney, Agent, or Firm* — Ladas & Parry, LLP

(57) ABSTRACT

A method of controlling an active rear wheel steering apparatus according to the present invention is a method of controlling a rear wheel steering apparatus of a vehicle with the rear wheel steering apparatus, the method including a step of determining an operation state of the rear wheel steering apparatus, a step of determining a running mode of the vehicle, and a step of controlling the rear wheel steering apparatus of the vehicle according to a result of determining at least one of the operation state of the rear wheel steering apparatus and the running mode of the vehicle.

8 Claims, 5 Drawing Sheets

(56) References Cited

U.S. PATENT DOCUMENTS

2011/0046851 A1* 2/2011 Onaya .................... B62D 7/148
  701/41
2013/0311045 A1* 11/2013 Tanimoto ........... B62D 15/0245
  701/42

FOREIGN PATENT DOCUMENTS

| DE | 10 2010 047 958 | 8/2011 |
| JP | 6-115443 | 4/1994 |
| JP | 9-123889 | 5/1997 |
| JP | 2008-24195 | 2/2008 |
| KR | 10-0783319 B1 | 12/2007 |
| KR | 10-2012-0051547 | 5/2012 |

OTHER PUBLICATIONS

Office Action dated May 5, 2016 for Chinese Patent Application No. 201410270382.X.

Office Action dated Jul. 20, 2016 for Korean Patent Application No. 10-2013-0098700 and it English machine translation provided by the Google translate.

Office Action dated Dec. 16, 2016 for Chinese Patent Application No. 201410270382.X and its English summary and machine translation provided by the Google translate.

* cited by examiner

METHOD OF CONTROLLING ACTIVE REAR WHEEL STEERING APPARATUS

CROSS-REFERENCE TO RELATED APPLICATIONS

This application claims priority to Korean Patent Application No. 10-2013-0098700 filed on Aug. 20, 2013, the disclosure of which is hereby incorporated by reference in its entirety.

BACKGROUND

1. Field of the Invention

The present invention relates to a method of controlling a rear wheel steering apparatus, and more specifically, to a method of controlling an active rear wheel steering apparatus in which a rear wheel steering apparatus is controlled according to a mode selection condition of an automatic parking system.

2. Discussion of Related Art

A four-wheel steering system based on a rear wheel steering apparatus having a mechanical or hydraulic operation structure has been developed and produced by most car manufacturers based on a concept of a four-wheel steering system introduced in 1980s. However, as vehicle drivers feel sense of incongruity at the time of manipulation and ride comfort is low, spread of the system has failed.

However, a rear wheel steering system (RWS; Rear Wheel Steering) that has enhanced problems of an existing four-wheel steering system has been actively developed with a recently increasing development need for electrically powered chassis products for fuel consumption reduction, expansion of EV/HEV distribution, and safety improvement.

A development purpose of a four-wheel steering system, including a rear wheel steering system, is to improve mobility of a large vehicle by reducing a rotation radius at the time of low-speed turn through reverse phase control of the rear wheel steering system (relative to a front wheel steering direction), and improve stability of the vehicle by reducing a yaw-rate and a side-slip at the time of high-speed turn through in-phase control of the rear wheel steering system (relative to the front wheel steering direction).

Further, accordingly, a method of determining a rear wheel steering mode using information of various vehicles and calculating/controlling a rear wheel target steering angle is applied.

However, control of such a rear wheel steering system causes a change in behavior of the vehicle unlike an existing front wheel steering vehicle, and thus correction and variation of various calculation algorithms for an existing driver assistance system (DAS) based on a front wheel steering system are needed.

Particularly, an automatic parking system (Smart Parking Assist System; SPAS) is more sensitive to a change in a trace of a vehicle due to a rear wheel steering apparatus since a movement trace of a front wheel steering system-based body of the vehicle is calculated to perform a running plan for parking, and an error is often generated.

Therefore, there is a need for a method for solving the problems as described above.

PRIOR ART DOCUMENTS

Patent Document (Patent Document 1) Korean Patent No. 10-0783319

SUMMARY OF THE INVENTION

A method of controlling an active rear wheel steering apparatus according to the present invention is intended to prevent an error through control of a rear wheel steering apparatus at the time of automatic parking of a vehicle.

Objects of the present invention are not limited to the forgoing, and a person skilled in the art will clearly understand other objects that are not mentioned from the following description.

A method of controlling a rear wheel steering apparatus of a vehicle with the rear wheel steering apparatus includes a step of determining an operation state of the rear wheel steering apparatus; a step of determining a running mode of the vehicle; and a step of controlling the rear wheel steering apparatus of the vehicle according to a result of determining at least one of the operation state of the rear wheel steering apparatus and the running mode of the vehicle.

Further, the step of controlling the rear wheel steering apparatus of the vehicle may include stopping the operation of the rear wheel steering apparatus when it is determined in the step of determining an operation state of the rear wheel steering apparatus that the rear wheel steering apparatus is in an abnormal state.

The method may further include: after the step of controlling the rear wheel steering apparatus of the vehicle, a step of informing a vehicle driver that the rear wheel steering apparatus is in an abnormal state.

The step of controlling the rear wheel steering apparatus of the vehicle may include stopping the operation of the rear wheel steering apparatus when it is determined in the step of determining a running mode of the vehicle that the vehicle is in an automatic parking mode.

Further, the method may further include: after the step of controlling the rear wheel steering apparatus of the vehicle, a step of switching the rear wheel steering apparatus to a default operation state when the automatic parking mode is released.

The step of controlling the rear wheel steering apparatus of the vehicle may include switching the rear wheel steering apparatus to a vehicle leaving assistance state when it is determined in the step of determining a running mode of the vehicle that the vehicle is in a vehicle leaving mode.

Further, the method may further include: after the step of controlling the rear wheel steering apparatus of the vehicle, a step of switching the rear wheel steering apparatus to a default operation state when a vehicle leaving mode is released.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a method of controlling an active rear wheel steering apparatus according to the present invention will be described in detail with reference to the drawings.

Figure 1:
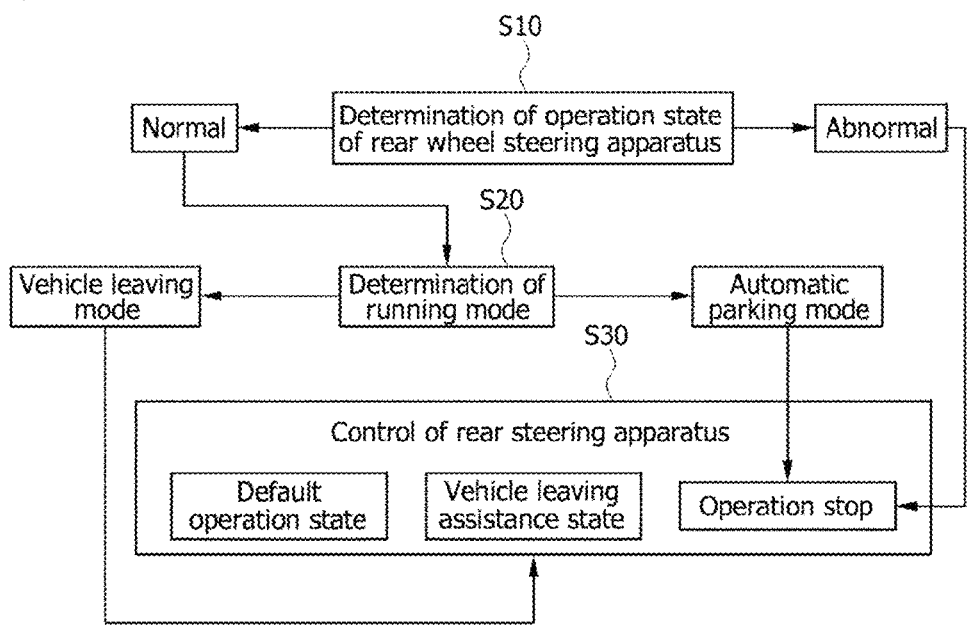
FIG. 1 is a flowchart illustrating each of steps of a method of controlling an active rear wheel steering apparatus according to an exemplary embodiment of the present invention.

FIG. 1 is a flowchart illustrating each step of a method of controlling an active rear wheel steering apparatus according to an exemplary embodiment of the present invention.

The method of controlling an active rear wheel steering apparatus according to an exemplary embodiment of the present invention includes step S10 of determining an operation state of a rear wheel steering apparatus, step S20 of determining a running mode of a vehicle, and step S30 of controlling the rear wheel steering apparatus of the vehicle according to a result of determining at least one of the operation state of the rear wheel steering apparatus and the running mode of the vehicle, as illustrated in FIG. 1.

Hereinafter, respective steps will be described in detail.

It may be determined whether the rear wheel steering apparatus normally performs an operation in step S10 of determining an operation state of the rear wheel steering apparatus. In other words, it is checked whether the operation state indicates normal or abnormal, and process proceeds to step S20 of determining a running mode when the operation state indicates normal.

When it is determined in step S10 that the rear wheel steering apparatus is abnormal, the operation of the rear wheel steering apparatus may stop in step S30 of controlling the rear wheel steering apparatus of the vehicle. In other words, when the rear wheel steering apparatus is abnormal, the operation of the rear wheel steering regardless stops regardless of the running mode of the vehicle.

Meanwhile, in this case, a step of informing a vehicle driver that the rear wheel steering apparatus is in an abnormal state may be included after step S30 of controlling the rear wheel steering apparatus of the vehicle.

Step S20 of determining a running mode of the vehicle is a step of determining whether a current running mode of the vehicle is in an automatic parking mode or a vehicle leaving mode.

In this case, if it is determined that the vehicle is in the automatic parking mode, the operation of the rear wheel steering apparatus may then stop in step S30 of controlling the rear wheel steering apparatus of the vehicle. This is because the stop of the operation of the rear wheel steering apparatus prevents an error of vehicle body movement trace calculation of the automatic parking system from being generated due to the rear wheel steering apparatus.

Further, in this case, a step of switching the rear wheel steering apparatus to a default operation state when the automatic parking mode is released may be further included after step S30 of controlling the rear wheel steering apparatus of the vehicle.

On the other hand, if it is determined that the vehicle is in a vehicle leaving mode, the rear wheel steering apparatus may be switched to a vehicle leaving assistance state in step S30 of controlling the rear wheel steering apparatus of the vehicle. This is because performance of leaving of the automatic parking system is improved by changing an operation determination condition of the rear wheel steering apparatus into a predetermined setting condition and performing reverse phase control relative to a front wheel steering angle to reduce a rotation radius of the vehicle at the time of leaving.

Further, in this case, a step of switching the rear wheel steering apparatus to the default operation state when the vehicle leaving mode is released may be further included after step S30 of controlling the rear wheel steering apparatus of the vehicle.

Each of the steps of the method of controlling an active rear wheel steering apparatus according to an exemplary embodiment of the present invention has been described above and will be described hereinafter using a specific example.

Figure 2:
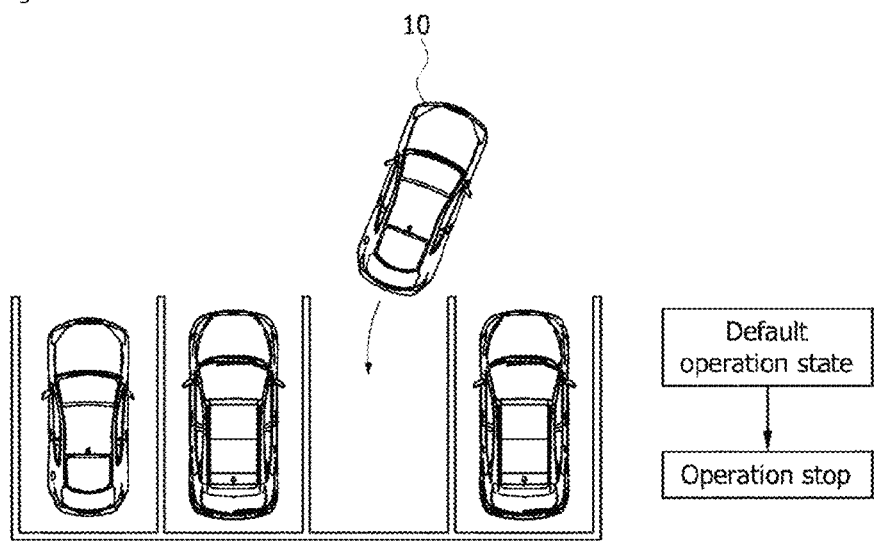
FIG. 2 is a diagram illustrating a state in which an operation of a rear wheel steering apparatus stops when a vehicle is in an automatic parking mode in the method of controlling an active rear wheel steering apparatus according to an exemplary embodiment of the present invention.

FIG. 2 is a diagram illustrating a state in which the operation of the rear wheel steering apparatus stops when the vehicle 10 is in an automatic parking mode in the method of controlling an active rear wheel steering apparatus according to an exemplary embodiment of the present invention.

As illustrated in FIG. 2, when the vehicle 10 performs parking, the running mode is switched to the automatic parking mode, and the rear wheel steering apparatus stops from the default operation state. Therefore, it is possible to prevent an error of vehicle body movement trace calculation of the automatic parking system from being generated due to rear wheel steering apparatus at the time of automatic parking.

Figure 3:
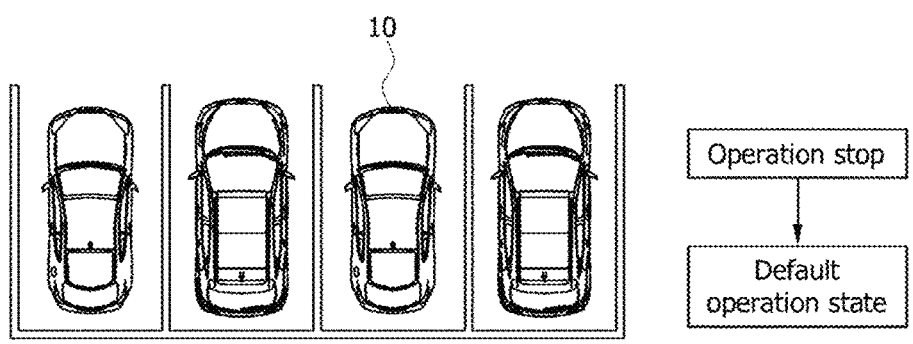
FIG. 3 is a diagram illustrating a state in which the rear wheel steering apparatus is switched to a default operation state when the automatic parking mode of the vehicle is released in the method of controlling an active rear wheel steering apparatus according to an exemplary embodiment of the present invention.

FIG. 3 is a diagram illustrating a state in which the rear wheel steering apparatus is switched to the default operation state when the automatic parking mode of the vehicle 10 is released in the method of controlling an active rear wheel steering apparatus according to an exemplary embodiment of the present invention.

As illustrated in FIG. 3, after the vehicle 10 completes parking, the automatic parking mode is released, and thus the rear wheel steering apparatus is switched from an operation stop state to the default operation state.

Figure 4:
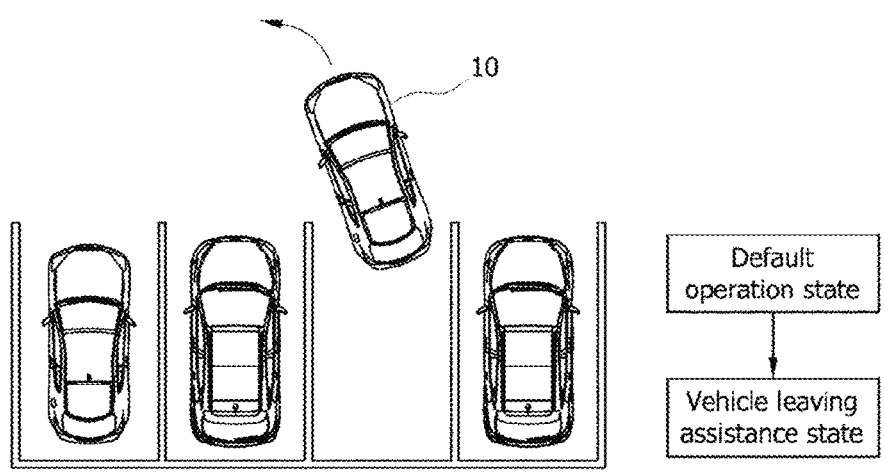
FIG. 4 is a diagram illustrating a state in which an operation of the rear wheel steering apparatus is switched to a vehicle leaving assistance state when the vehicle is in a vehicle leaving mode in the method of controlling an active rear wheel steering apparatus according to an exemplary embodiment of the present invention.

FIG. 4 is a diagram illustrating a state in which the operation of the rear wheel steering apparatus is switched to the vehicle leaving assistance state when the vehicle 10 is in the vehicle leaving mode in the method of controlling an active rear wheel steering apparatus according to an exemplary embodiment of the present invention.

As illustrated in FIG. 4, when the vehicle 10 leaves from a parking state, the running mode of the vehicle 10 is switched to the vehicle leaving mode, and thus the rear wheel steering apparatus is switched from the default operation state to the vehicle leaving assistance state. Therefore, the rear wheel steering apparatus changes an operation determination condition into a predetermined setting condition and performs reverse phase control relative to a front wheel steering angle to reduce a rotation radius of the vehicle 10 at the time of leaving, so that performance of leaving of the automatic parking system can be improved.

Figure 5:
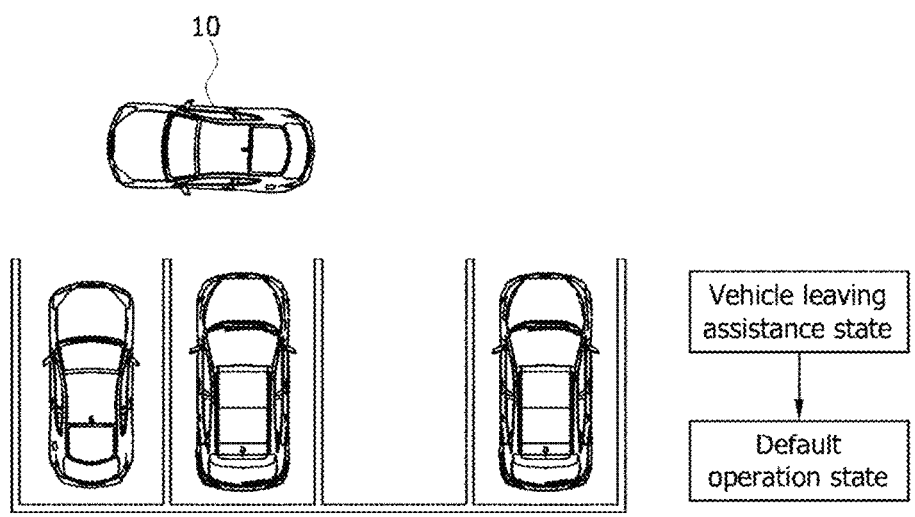
FIG. 5 is a diagram illustrating a state in which the operation of the rear wheel steering apparatus is switched to a default operation state when the vehicle leaving mode of the vehicle is released in the method of controlling an active rear wheel steering apparatus according to an exemplary embodiment of the present invention.

FIG. 5 is a diagram illustrating a state in which the operation of the rear wheel steering apparatus is switched to the default operation state when the vehicle leaving mode of the vehicle 10 is released in the method of controlling an active rear wheel steering apparatus according to an exemplary embodiment of the present invention.

As illustrated in FIG. 5, after the vehicle 10 completes vehicle leaving, the vehicle leaving mode is released, and thus the rear wheel steering apparatus is switched from the vehicle leaving assistance state to the default operation state.

As described above, with the method of controlling an active rear wheel steering apparatus according to the present invention, it is possible to minimize influence of a parking mode error on the existing automatic parking system based on a front wheel steering system and improve performance of the vehicle leaving mode by selectively restricting or activating the operation of the rear wheel steering apparatus according to the mode selection condition of the automatic parking system.

The effects of the present invention are not limited to the foregoing, and other effects that are not mentioned can be definitely understood from the following description.

The exemplary embodiments and the accompanying drawings described in this disclosure only show a part of a technical idea of the present invention. Therefore, since the exemplary embodiments disclosed in this disclosure are not intended to limit the technical idea of the present invention but illustrate the technical idea, it is obvious that the scope of the technique idea of the present invention is limited by the exemplary embodiments. Variants and specific exemplary embodiments that a person skilled in the art can easily derive within the technical idea included in the disclosure and the drawings of the present invention should be construed to be all included in the right range of the present invention.

DESCRIPTION OF REFERENCE NUMERALS

10: Vehicle

What is claimed is:

1. A method of controlling a rear wheel steering apparatus of a vehicle with the rear wheel steering apparatus, the method comprising:
   determining an operation state of the rear wheel steering apparatus among a normal state and an abnormal state;
   determining a running mode of the vehicle among an automatic parking mode and a vehicle leaving mode; and
   controlling the rear wheel steering apparatus of the vehicle according to a result of determining at least one of the operation state of the rear wheel steering apparatus and the running mode of the vehicle, wherein the controlling the rear wheel steering apparatus comprises controlling the rear wheel steering apparatus of the vehicle according to whether the automatic parking mode is activated,
   wherein when the vehicle leaves from a parking spot, the running mode of the vehicle is changed to the vehicle leaving mode and rear wheel steering is controlled using reverse phase control relative to front wheel steering.

2. The method according to claim 1, wherein the controlling the rear wheel steering apparatus of the vehicle includes stopping the operation of the rear wheel steering apparatus when it is determined in the determining the operation state of the rear wheel steering apparatus that the rear wheel steering apparatus is in the abnormal state.

3. The method according to claim 2, further comprising: after the controlling the rear wheel steering apparatus of the vehicle, informing a vehicle driver that the rear wheel steering apparatus is in the abnormal state.

4. The method according to claim 1, further comprising: after the controlling the rear wheel steering apparatus of the vehicle, switching the rear wheel steering apparatus to a default operation state when the automatic parking mode is released.

5. The method according to claim 1, wherein the controlling the rear wheel steering apparatus of the vehicle may include switching the rear wheel steering apparatus to a vehicle leaving assistance state when it is determined in the determining the running mode of the vehicle that the vehicle is in a vehicle leaving mode.

6. The method according to claim 5, further comprising: after the controlling the rear wheel steering apparatus of the vehicle, switching the rear wheel steering apparatus to a default operation state when the vehicle leaving mode is released.

7. The method of claim 1, wherein the rear wheel steering apparatus has a default operation state and a vehicle leaving assistance state, and when the vehicle leaves from the parking spot, a state of the rear wheel steering apparatus is changed to the vehicle leaving assistance state.

8. The method of claim 1, wherein the rear wheel steering apparatus has a default operation state and a vehicle leaving assistance state, and the method further comprises, after completing the vehicle leaving mode, changing a state of the rear wheel steering apparatus from the vehicle leaving assistance state to the default operation state.

* * * * *